United States Patent [19]

Hecker et al.

[11] Patent Number: 4,573,758
[45] Date of Patent: Mar. 4, 1986

[54] BEAM DEFLECTION MECHANISM

[75] Inventors: Joel Hecker, Port Jefferson Station; Howard Stern, Greenlawn; Thomas Heydenburg, East Setauket, all of N.Y.

[73] Assignee: Robotic Vision Systems, Inc., Hauppauge, N.Y.

[21] Appl. No.: 615,817

[22] Filed: May 31, 1984

[51] Int. Cl.⁴ .................................................. G02B 5/32
[52] U.S. Cl. .................................... 350/3.71; 350/3.7; 350/3.73; 350/3.78; 350/452; 350/6.3
[58] Field of Search ................... 350/3.71, 6.3, 3.7, 350/3.72, 3.73, 3.75, 452, 3.78

[56] References Cited

U.S. PATENT DOCUMENTS

| | | | |
|---|---|---|---|
| 3,788,726 | 1/1974 | Groh et al. | 350/3.78 |
| 4,170,396 | 10/1979 | Kraft | 350/3.7 |
| 4,337,494 | 7/1982 | Braiser | 350/3.71 |

FOREIGN PATENT DOCUMENTS 55-67721  5/1980  Japan ................................. 350/6.3

*Primary Examiner*—John K. Corbin
*Assistant Examiner*—William Propp
*Attorney, Agent, or Firm*—Max Fogiel

[57] ABSTRACT

An arrangement for deflecting a beam of monochromatic light in a rapid and accurate manner. To deflect the beam, segments of a number of Fresnel lenses are produced onto a single flat glass substrate disk. The optical axis of each of the lens segments corresponds to the center of rotation of the disk. The disk is mounted on a shaft which is rotatable about that optical axis. The beam of light to be deflected is applied to the surface of the disk at a point off the axis. When the beam passes through the disk it becomes deflected by one of the lens elements. The degree of deflection depends on the nature of the element, and the rate at which the beam is deflected from one orientation to another is determined by the rate of rotation of the disk.

8 Claims, 14 Drawing Figures

BEAM DEFLECTION MECHANISM

BACKGROUND OF THE INVENTION

There are situations where it is advantageous to be able to direct a beam of light to a specific point in space accurately, repeatably and quickly.

The simplest approach is to mount a mirror on some mechanical orientation device, e.g. a gimbal mount, which aims the beam to the desired point. In this method, however, a 1 degree error in the orientation of the mirror leads to a 2 degree error in the direction of the beam. This method is also characterized by slow response time, and complex mechanical construction.

A second approach is to fabricate holographic diffraction gratings on a flat glass substrate. In this method the direction of the beam is determined by the orientation of the beam with respect to the grating. Typically a number of gratings are fabricated around a common axis on a single substrate. The orientation of the beam with respect to the gratings is achieved by rotating the substrate about the axis. In this method a 1 degree error in rotation of the grating results in a $\sqrt{2}$ degree error in the direction of the beam. This is only a 29% improvement in error sensitivity.

The present invention employs a flat glass substrate onto which a number of optical elements have been fabricated. These optical elements are segments of Fresnel zone plates. These lenses have a common optical axis but are angularly displaced from each other about the common axis. As the glass substrate is rotated about the axis, an input beam of light would be incident on different Fresnel lenses, and thus be focused to some point in space. As long as the input beam of light is incident on a single Fresnel lens element it will be directed to a single point in space. In this way the direction of the beam of light is insensitive to errors in positioning within a lens element, and as a result the desired accuracy and repeatability are achieved.

SUMMARY OF THE INVENTION

It is the object of the present invention to overcome the prior art disadvantages. In particular, it is the object of the present invention to replace a gimbal-mounted mirror, rotating polygon mirrors, or rotating holographic gratings as a means of directing the beam of light.

In keeping with these objects, and with still others which will become apparent as the description proceeds, the important characteristics of the invention are: the precision and repeatability of the deflection of the beam, the magnitude of the deflection, arbitrary deflection schemes with no loss in performance, and the simplicity of the final embodiment.

The present invention is comprised as follows: segments of a number of Fresnel lenses are fabricated (holographically, ruled, or by some other means) onto a single flat glass substrate disk. The optical axis of each of these lens segments corresponds to the center of rotation of the disk. This disk would then be mounted to a suitable device and rotated about the common optical axis. A beam of light would be presented to the surface of the disk at some point off axis. As the beam passes through the disk it will be deflected by one of the lens elements. The degree of deflection depends on the nature of the lens element. The rate at which the beam is deflected from one orientation to another is determined by the rate of rotation of the disk.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1A:
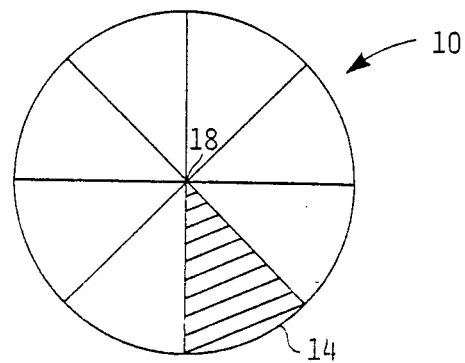
FIG. 1a shows schematically a holographic scanner with gratings perpendicular to a radial line.
Figure 1B:
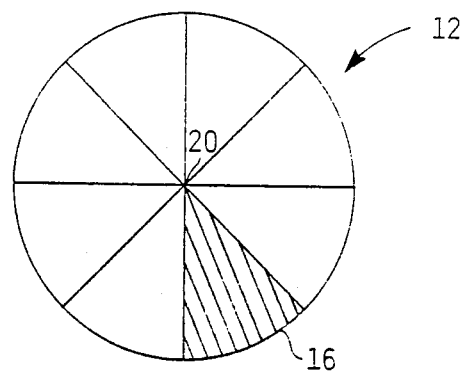
FIG. 1b is a schematic view of a holographic scanner with grating parallel to a radial line.
Figure 2A:
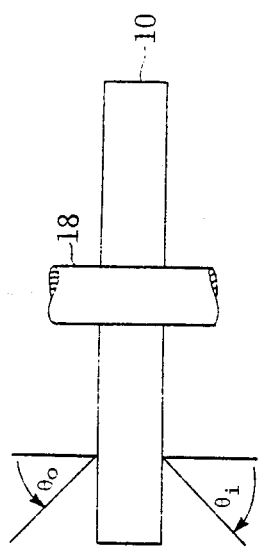
FIG. 2a is a side view of the holographic scanner in FIG. 1a when in use.
Figure 2B:
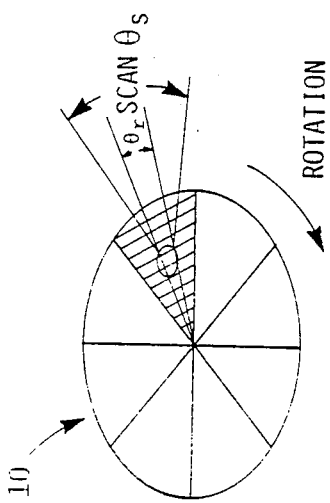
FIG. 2b is a top view of the holographic scanner in FIG. 1a when in use.
Figure 2C:
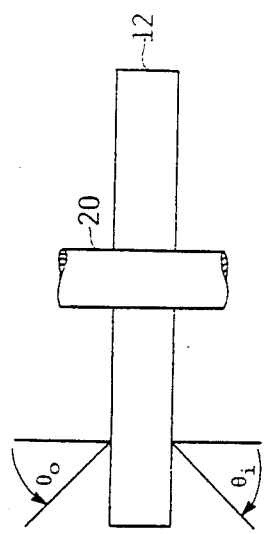
FIG. 2c is a side view of the holographic scanner in FIG. 1b when in use.
Figure 2D:
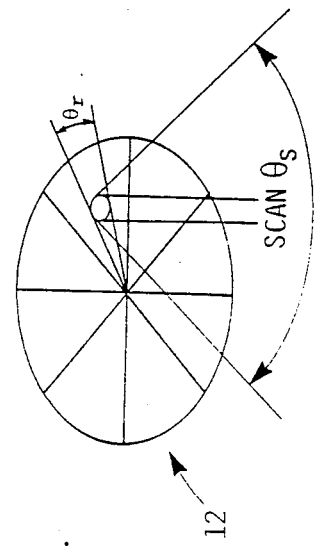
FIG. 2d is a top view of the holographic scanner in FIG. 1b when in use.

There are currently available devices called holographic scanners 10, 12 or "hologons". They are made in two basic forms shown in FIGS. 1a and 1b. Fabricated on the surface of these devices are parallel diffraction gratings. In the case of FIG. 1a, the grating lines 14 are perpendicular to a radial line passing through the center of each particular grating segment. In the case of FIG. 1b, the grating lines 16 are parallel to the radial line. As these gratings are rotated about the central axis 18, 20, an input beam is scanned through an arc. FIGS. 2a, b, c, and d show each of these scanners in use. The relationship between the input and output beams of these scanners is summarized by the following two equations:

$$\sin \theta_i + \sin \theta_o = \lambda/d$$

$$\sin \theta_s = \frac{\lambda}{d} \sin \theta_r \text{ typically } \lambda/d = \sqrt{2}$$

where $\theta_i$, $\theta_o$, $\theta_s$, $\theta_r$, are defined in FIGS. 2a, b, c, d. The symbol, $\lambda$, is the wave length of the input beam, and d is the spacing between adjacent grating lines within an element. Typically these devices are used in raster scanning systems where one wants to scan a straight line at high speed. If, however, one wanted to scan a series of parallel lines one could alter the value of d from segment to segment. The consequence of this is that $\theta_o$ changes from segment to segment.

Figure 3A:
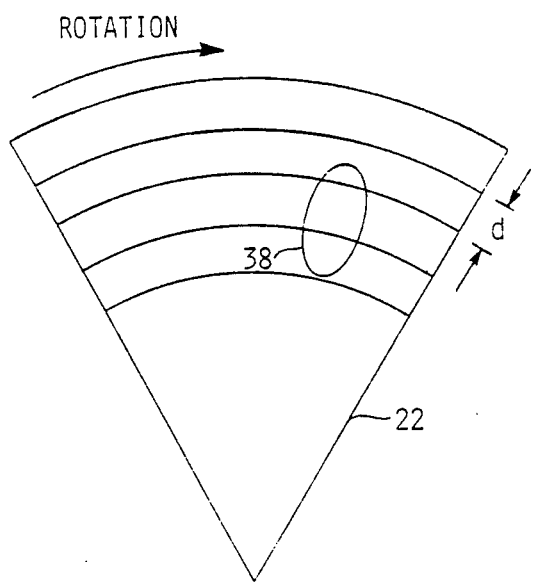
FIG. 3a is a schematic view of a constant radial grating period deflector element.
Figure 3B:
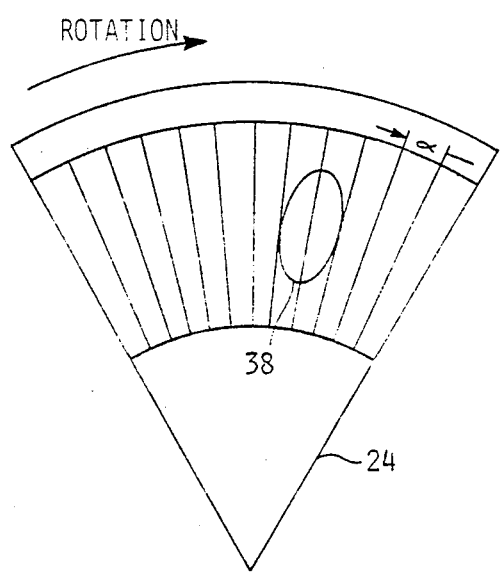
FIG. 3b is a schematic view of a constant angular grating period deflector element.

If one were to construct gratings on the surface such that during rotation within an element, the grating does not change shape as seen by the input beam, the deflection of the input beam would be insensitive to rotation within that element. If this grating changes its value of d from element to element then the output beam deflection would be changed, i.e., $\theta_o$ would change from element to element. FIG. 3a shows an element 22 with constant radial grating period d. FIG. 3b shows an element 24 with a constant angular grating period $\alpha$.

Figure 4A:
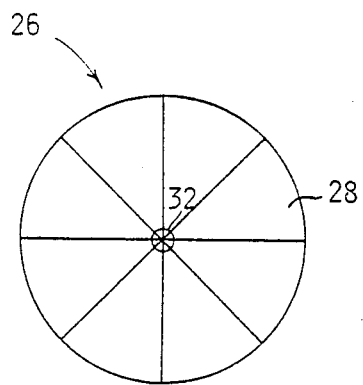
FIG. 4a is a front view of Fresnel deflector element.

The present invention employs this technique such that $\theta_o = 0$ for any value of $\theta_r$. The method to achieve this is as follows: FIG. 4a shows a front view of a Fresnel beam deflector 26 with 8 segments of Fresnel lenses 28 (or Fresnel zone plates) fabricated on the surface of a flat glass substrate 30. In general any number of segments could be formed on a single substrate.

Figure 4B:
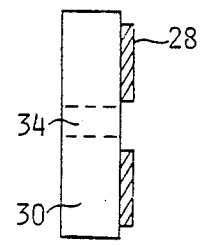
FIG. 4b is a side view of Fresnel deflector element.

The segments need not be of the same size. Each segment, N, is a Fresnel lens with an associated focal length $f_n$. The optical axis 32 for each lens is perpendicular to the faces of the substrate, at the center of the disk. FIG. 4b shows a side view of the same deflector. A hole 34 is made through the center of the disk such that the disk can be mounted onto the shaft 36 of a suitable device and rotated. In this way the axis of rotation of the disk is parallel to the optical axis of each Fresnel lens element.

Figure 5:
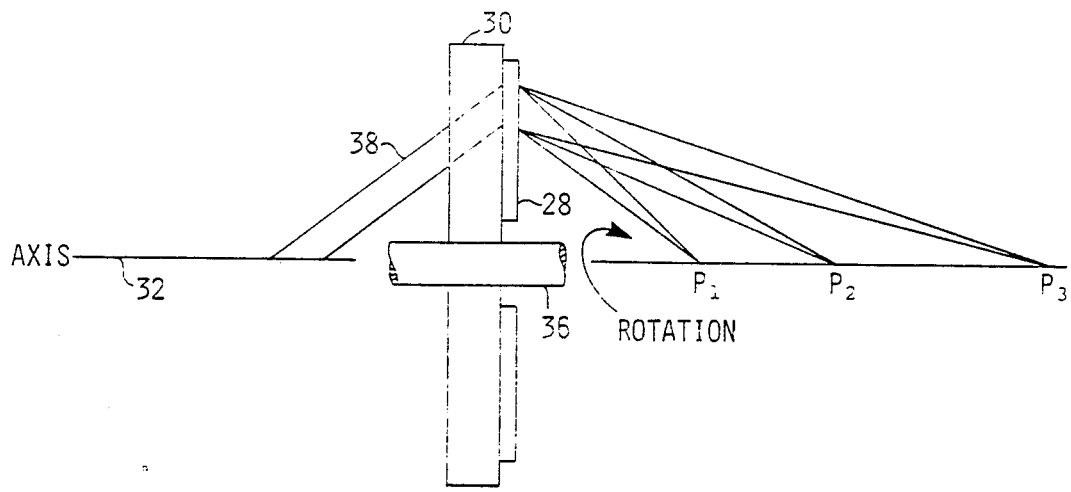
FIG. 5 is a sectional view of Fresnel deflector when in use.

FIG. 5 shows a sectional view of the deflector in use. A beam of light 38 is incident on the rear of the disk. The beam passes through the disk directly to the front surface where it encounters the Fresnel lens element 28. The nature of the Fresnel lenses are such that the beam will be focused to a point, P, on the axis 32. For each element, N, with its associated focal length $f_n$, there is only one point, $P_n$, to which the beam of light will be focused. It will remain focused at $P_n$ for the time that the input beam is incident on the element N. If there are K separate elements formed on a single substrate, then as the disk rotates the beam will be incident on the elements in the order 1, 2, 3 ... K, 1, 2, 3 ... K ... and will thus be deflected to P1, P2, P3 ... PK, P1, P2 ... PK ... in succession. It should be noted that because a part of a Fresnel lens is used, the beam will not be sensitive to angular rotation of the disk. Thus this invention removes the requirement for uniform rotational motion and enables the beam to quickly change the focused location as the beam passes from one segment to another. The dwell time of the beam becomes the time for the segment to traverse the beam. It should also be noted that the relationship between successive focal lengths, $f_n$ and $f_{n+1}$, is arbitrary, and therefore, so is the relationship between $P_n$ and $P_{n+1}$. As a result, the time needed to deflect from one point to another is independent of the magnitude of the deflection.

If the wavelength of the input beam is $\lambda$, it can be shown that $P_n$ is a function of $\lambda$, i.e. $f_n(\lambda)$. Therefore, if $\lambda$ does not change, then every time the input beam is incident on an element it will be focused on point $P_n$. But if one were able to change $\lambda$, in some controlled manner, then one could control $P_n$. In this way the positioning capabilities of the deflector are greatly increased.

If the deflector is used, as in FIG. 5, the input beam will be focused to a small point, P, on the axis. For some applications this may not be desirable. In this case, an alternate configuration, FIG. 6a, could be used. By the addition of corrective optics, one can manipulate the deflected beam 42 to any desired form, i.e. converging, diverging or collimated. In particular, if a toroidal lens 40 is placed properly, one could generate a plane of light which could be deflected. This is shown in FIGS. 6a and 6b.

Figure 6A:
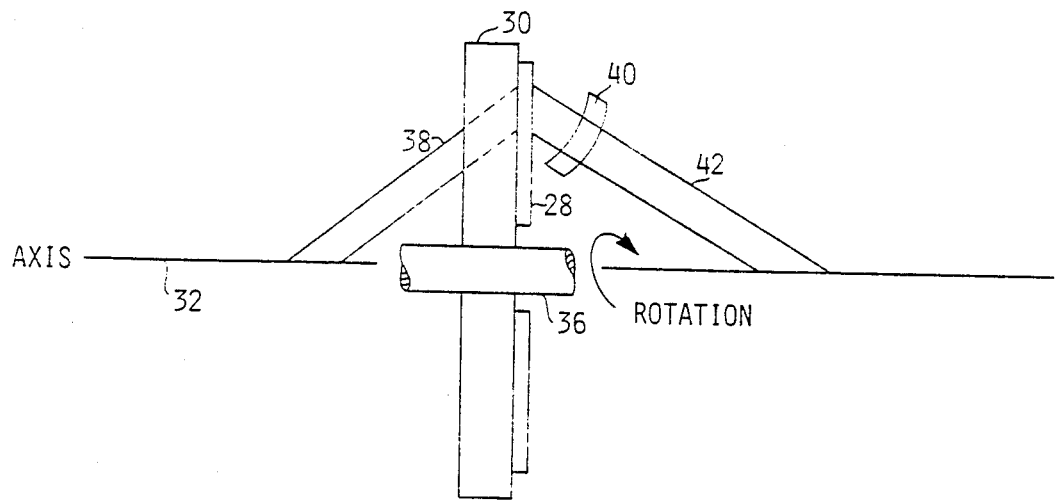
FIG. 6a is a sectional view of Fresnel deflector employing a toroidal lens.
Figure 6B:
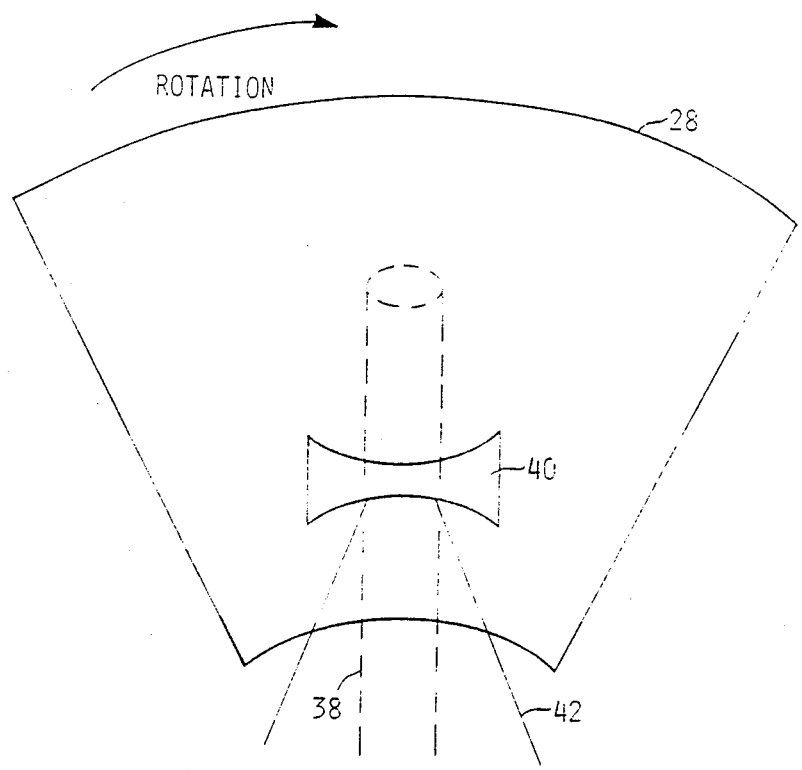
FIG. 6b is a front view of Fresnel deflector element employing a toroidal lens.
Figure 7:
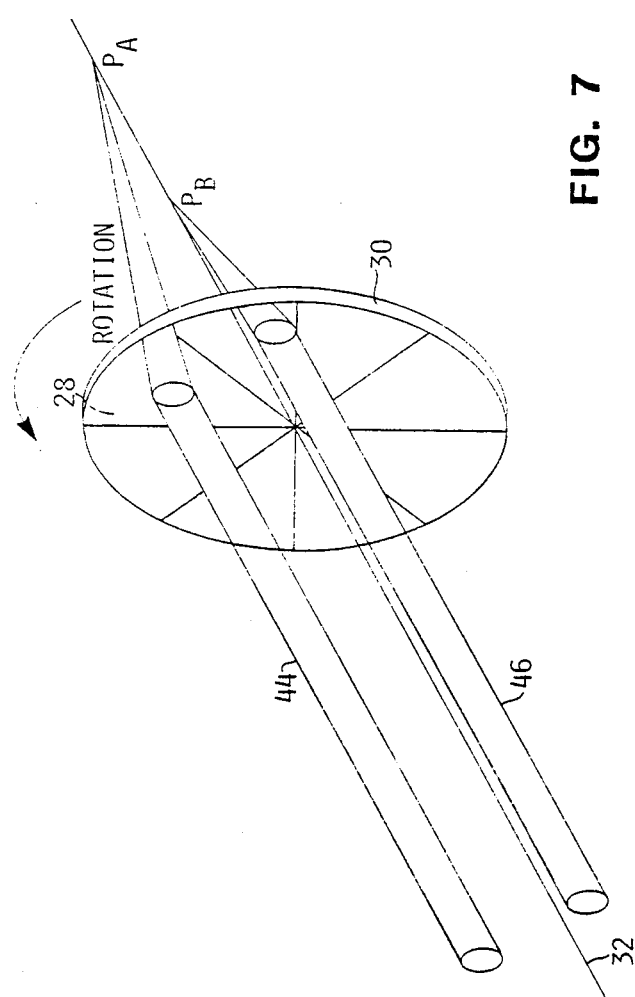
FIG. 7 is a perspective view of a Fresnel deflector with multiple inputs.

As shown in FIGS. 5 and 6a, 6b, the deflection of the beam is constrained to one plane. If it is desired to deflect the beam in more than one plane, multiple inputs 44, 46 may be used, as shown in FIG. 7. These are focused to points $P_A$ and $P_B$, respectively.

The relationship between the output planes is determined by the relationship of the input beams. Any number of input beams are allowable. The separate input and output beams act independently.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An arrangement for deflecting a beam of monochromatic light substantially rapidly and accurately, comprising: a rotatable disk having Fresnel zone plate segments and an axis of rotation; said zone plate segments having axes of symmetry placed substantially co-linear with the axis of rotation of said rotatable disk for reducing sensitivity to angular rate of rotation of said disk; means for driving said disk; a source of monochromatic light for directing a beam of monochromatic light through said disk and said segments for deflecting said beam by a predetermined angle, said beam remaining stationary and focused on a point of the axis of rotation while said beam resides in any one segment, said beam being stably positioned by being switched sufficiently rapidly from one location to another as lens segments with differing focal distances pass through the light beam.

2. An arrangement as defined in claim 1 including beam expanding optical means for producing a light plane that can be stepped substantially rapidly and accurately to more than one deflection angle.

3. An arrangement as defined in claim 1, wherein said beam intercepts said disk at a point off the axis of rotation of said disk.

4. An arrangement as defined in claim 1, wherein the amount of deflection is dependent on the characteristics of said segments.

5. An arrangement as defined in claim 1, wherein the rate of deflection of said beam from one angle to another is determined by the rate of rotation of said disk.

6. An arrangement for deflecting a beam of monochromatic light substantially rapidly and accurately, comprising: a rotatable disk having segments of radially directed grating structures; said structures having a constant angular grating period; means for driving said disk; a source of monochromatic light for directing a beam of monochromatic light through said disk and said segments for deflecting said beam by a predetermined angle, deflection of said beam being based solely on change in grating spacing from one segment to the next.

7. An arrangement as defined in claim 6 including beam expanding optical means for producing a light plane that can be stepped substantially rapidly and accurately to more than one deflection angle.

8. An arrangement for deflecting a beam of monochromatic light substantially rapidly and accurately, comprising: a rotatable disk having segments of tangentially directed grating structures; said structures having a constant angular radial grating period; means for driving said disk; a source of monochromatic light for directing a beam of monochromatic light through said disk and said segments for deflecting said beam by a predetermined angle, deflection of said beam being based solely on change in grating spacing from one segment to the next.

* * * * *

UNITED STATES PATENT AND TRADEMARK OFFICE
CERTIFICATE OF CORRECTION

PATENT NO. : 4,573,758
DATED : Mar. 4, 1986
INVENTOR(S) : Hecker et al.

It is certified that error appears in the above-identified patent and that said Letters Patent are hereby corrected as shown below:

Claim 8, line 5 (column 5, line 7): cancel "angular".

Signed and Sealed this

Thirty-first Day of March, 1987

Attest:

DONALD J. QUIGG

Attesting Officer      Commissioner of Patents and Trademarks